(12) United States Patent
Clément et al.

(10) Patent No.: US 12,373,748 B2
(45) Date of Patent: Jul. 29, 2025

(54) SYSTEMS AND METHODS OF ASSIGNING MICROTASKS OF WORKFLOWS TO TELEOPERATORS

(71) Applicant: Teleo, Inc., Mountain View, CA (US)

(72) Inventors: Romain Clément, Mountain View, CA (US); Vinay Shet, Fremont, CA (US)

(73) Assignee: Teleo, Inc., Mountain View, CA (US)

( * ) Notice: Subject to any disclaimer, the term of this patent is extended or adjusted under 35 U.S.C. 154(b) by 272 days.

(21) Appl. No.: 17/403,874

(22) Filed: Aug. 16, 2021

(65) Prior Publication Data

US 2022/0051165 A1 Feb. 17, 2022

Related U.S. Application Data

(60) Provisional application No. 63/066,439, filed on Aug. 17, 2020.

(51) Int. Cl.
| | |
|---|---|
| G06Q 10/0631 | (2023.01) |
| G05B 19/418 | (2006.01) |
| G06Q 10/0639 | (2023.01) |
| G06Q 10/10 | (2023.01) |
| G06Q 10/105 | (2023.01) |
| G06Q 50/08 | (2012.01) |
| H04L 67/12 | (2022.01) |

(52) U.S. Cl.
CPC ........ *G06Q 10/063112* (2013.01); *G05B 19/41875* (2013.01); *G06Q 10/063118* (2013.01); *G06Q 10/06395* (2013.01); *G06Q 10/06398* (2013.01); *G06Q 10/103* (2013.01); *G06Q 10/105* (2013.01); *G06Q 50/08* (2013.01); *H04L 67/12* (2013.01); *G05B 2219/31449* (2013.01); *G05B 2219/32368* (2013.01)

(58) Field of Classification Search
CPC ........... G06Q 10/1097; G06Q 50/08; G06Q 10/06311; G05D 1/0088; G05D 1/0011
USPC .............. 705/7.14, 7.21, 7.27; 718/104
See application file for complete search history.

(56) References Cited

U.S. PATENT DOCUMENTS

| | | | |
|---|---|---|---|
| 10,595,455 B2 * | 3/2020 | Foster | G05D 1/0219 |
| 10,893,107 B1 * | 1/2021 | Callari | G06F 18/2115 |
| 2010/0306005 A1 * | 12/2010 | Yengulalp | G06Q 10/0633 718/103 |
| 2017/0103359 A1 * | 4/2017 | Teevan | G06Q 10/063114 |

(Continued)

OTHER PUBLICATIONS

Dadhich, Siddharth, Ulf Bodin, and Ulf Andersson. "Key challenges in automation of earth-moving machines." Automation in construction 68 (2016): 212-222. (Year: 2016).*

*Primary Examiner* — Rutao Wu
*Assistant Examiner* — Letoria G Knight
(74) *Attorney, Agent, or Firm* — Cognition IP, P.C.; Edward Steakley; Saleh Kaihani

(57) ABSTRACT

A method and system may generate a quality control profile to indicate an expertise level and one or more skills of a teleoperator(s). The control center evaluates optimization criteria for a workflow to assign performance of microtasks of the workflow to select teleoperators from a pool of teleoperators. Each teleoperator accesses teleoperation functionality for remote control of a plurality of types of equipment at one or more defined geographic areas and each teleoperator is remotely located from the defined geographic areas. The control center generates queues for each of the select teleoperators that include corresponding assigned microtasks.

21 Claims, 9 Drawing Sheets

(56) References Cited

U.S. PATENT DOCUMENTS

| | | | | |
|---|---|---|---|---|
| 2017/0123421 | A1* | 5/2017 | Kentley | G05D 1/695 |
| 2017/0323233 | A1* | 11/2017 | Bencke | G06Q 10/0633 |
| 2017/0337492 | A1* | 11/2017 | Chen | G06Q 10/0633 |
| 2018/0096286 | A1* | 4/2018 | Cook | G06Q 10/06316 |
| 2018/0308068 | A1* | 10/2018 | Hamilton | G06Q 10/04 |
| 2018/0365053 | A1* | 12/2018 | Burroughs | G06F 9/4881 |
| 2019/0275671 | A1* | 9/2019 | Natarajan | G06N 20/00 |
| 2022/0180291 | A1* | 6/2022 | Abeykoon | G06Q 10/0631 |
| 2023/0229986 | A1* | 7/2023 | Cami | G06Q 10/06312 |
| | | | | 705/7.15 |

* cited by examiner

SYSTEMS AND METHODS OF ASSIGNING MICROTASKS OF WORKFLOWS TO TELEOPERATORS

CROSS-REFERENCE TO RELATED APPLICATIONS

This application claims the benefit of U.S. Provisional Application No. 63/066,439, filed Aug. 17, 2020, which is hereby incorporated by reference in its entirety.

BACKGROUND

The field of teleoperation has recently experienced a tremendous amount of innovation, as well as popular interest. Teleoperation generally refers to the control of a system by a human operator that is remotely located a distance away from the system. The system may perform various actions according to underlying software that determines which actions are to be performed by the system. In many cases, such tasks are predetermined tasks or repetitive tasks. The human operator may be provided with telepresence such that the human operator is provided visual and audio information that would be physically available to him as if he were directly operating the system at the current location of the system. Based on the visual and audio information, the human operator may direct or augment the actions performed by the system.

SUMMARY

Various embodiments relate to a control station(s) at a control center(s) for optimizing the completion of a task's workflow by utilizing a plurality of teleoperators that have varying degrees of skill and expertise for various portions of the workflow. Various embodiments described herein allow for teleoperators to instantly switch between the remote control of different equipment and/or vehicles, even those operating across multiple, different geographical locations. Deployment of the control center provides the advantages of ensuring that each available teleoperator may be constantly utilized and that no time is lost due to equipment being left unused. If a piece of equipment is held offline due to other work being done that blocks it's usage, or—for example—if a fleet of equipment is down due to an upcoming inspection on the site, a teleoperator(s) can still be assigned to remotely control other equipment to perform large or small tasks regardless of where it is located. The control center thereby significantly increases teleoperator productivity.

The control center generates a quality control profile for one or more teleoperators. The quality control profile indicates an expertise level and one or more skills of each teleoperator. The control center evaluates optimization criteria for a workflow to assign performance of microtasks of the workflow to select teleoperators from a pool of teleoperators based in part on the respective quality control profiles. It is understood that the microtasks are ordered for performance according to a workflow sequence. Each teleoperator accesses teleoperation functionality for remote control of a plurality of types of equipment at one or more defined geographic areas and each teleoperator is remotely located from the one or more defined geographic areas. The control center generates queues for each of the select teleoperators that includes corresponding assigned microtasks, the assigned microtasks being ordered across the queues in accordance with workflow sequence. The control center sends notifications to each teleoperator to perform an assigned microtask when a preceding microtask has been completed.

In various embodiments, a teleoperator may be an authorized human teleoperator accessing teleoperation functionality at a control station and/or may also be one or more teleoperation algorithms that autonomously control teleoperation functionality.

Various machine learning methods may be implemented to build quality control profiles, evaluate workflow optimization criteria and/or to define microtasks in order to divide a task into a workflow whereby the microtasks are identified by the machine learning methods based on skills required to complete the task's workflow and the quality control profiles of available teleoperators.

According to various embodiments, a pending task may require a workflow to be completed. A workflow for a pending task may already be pre-defined such that the microtasks are already identified and the control center matches each pre-defined microtask with a teleoperator based on the matching the teleoperator's quality control profile to data for the pre-defined microtask that describes the skills, timing and quality required by the pre-defined microtask.

In other embodiments, microtasks may themselves be defined by the control center whereby each individual microtask is then further assigned by the control center to a particular teleoperator that has a corresponding quality control profile that indicates the particular teleoperator has the skill and expertise to perform the microtask via remote control of equipment. Machine learning methods and models may be employed by the control center to define the microtasks for a pending task's workflow based on prior performances of the same pending task and/or prior performances of similar tasks. Machine learning methods and models may be employed by the control center to identify teleoperators to perform microtasks.

According to various embodiments, the control center assigns microtasks of a workflow to meet one of more workflow optimization criteria. Optimization criteria may be based on a desired total of amount of time to complete the workflow, a level of quality of work that is desired during completion of the workflow and/or a desired amount of idle time for available teleoperators during completion of the workflow. For example, the control center may determine that two candidate teleoperators meet the expertise and quality level required by a particular microtask in a workflow based on their corresponding quality control profiles. However, the control center may select a particular teleoperator from the two candidate teleoperators to perform the particular microtask based on a determination that assigning the particular teleoperator will result in completion of the workflow that meets the workflow's optimization criteria while assigning the other candidate teleoperator to perform a different microtask for which the particular teleoperator is less skilled.

Various embodiments relate to the teleoperation of various types of construction site equipment for operation at one or more construction sites. However, other embodiments are not limited to the teleoperation of construction site equipment.

Embodiments may relate to one or more vehicles operating within a pre-defined geographical area, such as a construction site. The vehicles may be construction site vehicles.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
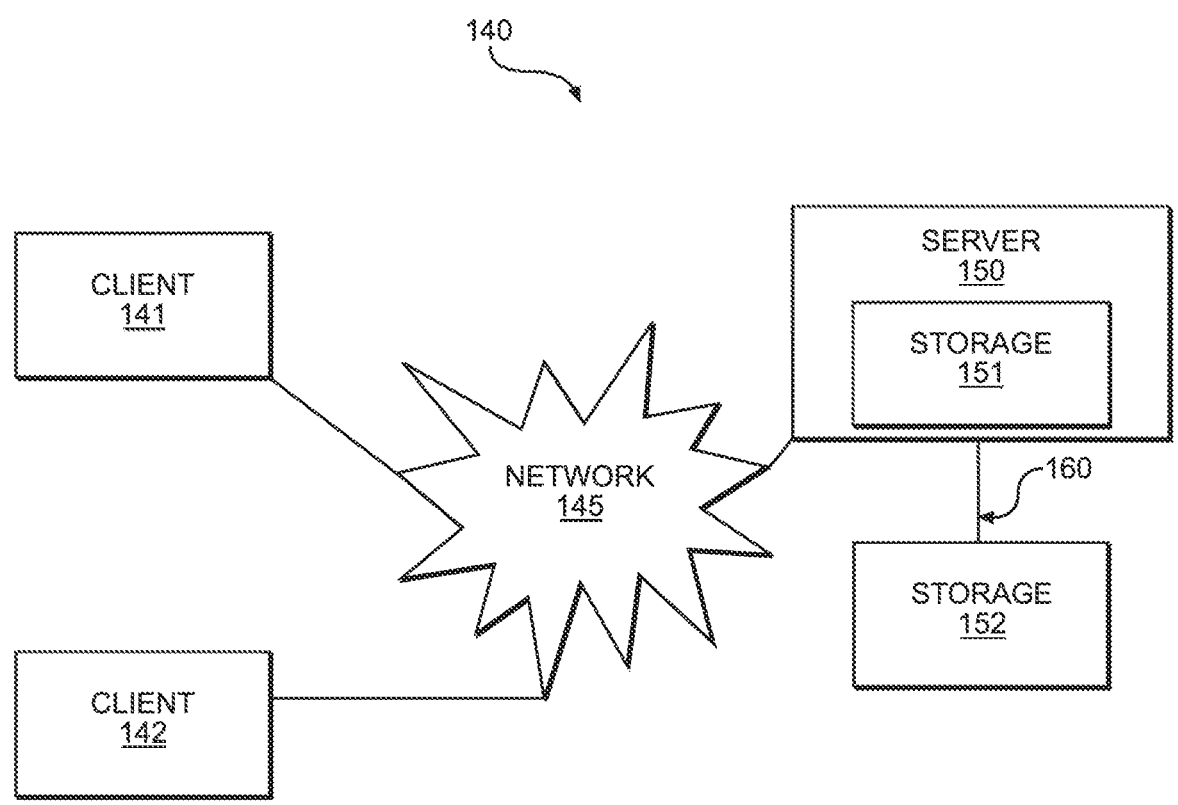
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

It is understood that the terms "vehicles" or "robot" may mean any platform which could be operated over teleoperation. According to various embodiments, a vehicle or equipment may be, but is not limited to, a skid steer, a compact track loader, a wheeled loader, a backhoe, an excavator, a loading trick, a bulldozer and a compactor.

FIG. 1A illustrates an exemplary network environment in which embodiments may operate. In the exemplary environment 140, two clients 141, 142 are connected over a network 145 to a server 150 having local storage 151. Clients and servers in this environment may be computers. Server 150 may be configured to handle requests from clients. Server 150 may be implemented as a number of networked server devices, though it is illustrated as a single entity. Communications and transmissions between a base station and one or vehicles and between a base station and one or more control centers as described herein may be executed similarly as the client 141, 142 requests.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151.

In another embodiment, the client 141 may be a vehicle that sends vehicle sensor data used during execution of the method 200 or other method herein. This may be accomplished via communication over the network 145 between the client 141 and server 150. For example, the client may communicate a request to the server 150 to store a file with a specified file name in the storage 151. The server 150 may respond to the request and store the file with the specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
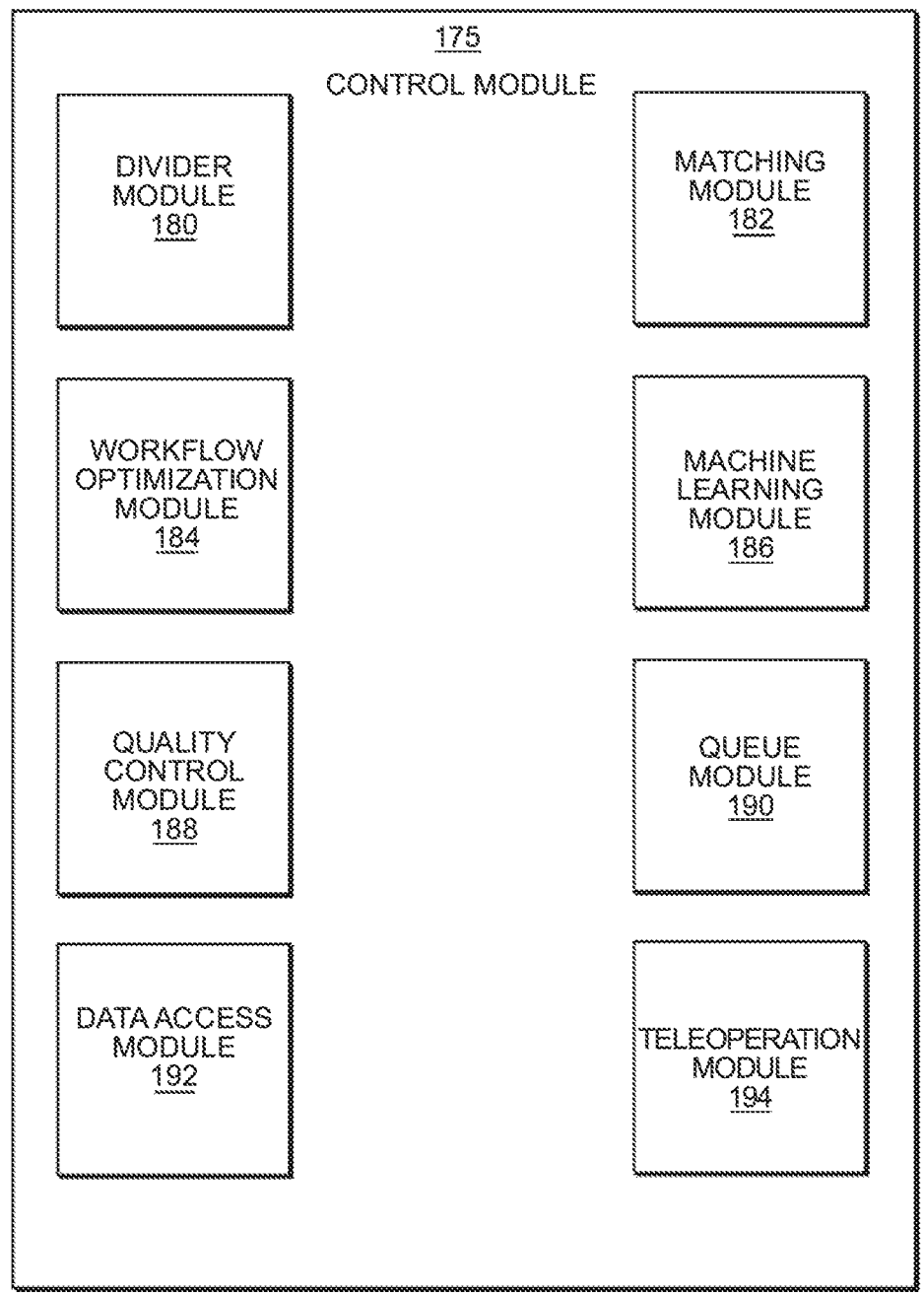
FIG. 1B is a diagram illustrating an exemplary environment in which some embodiments may operate.

FIG. 1B illustrates exemplary software modules that may execute some of the functionality described herein by. FIG. 1B illustrates a block diagram of an example control module 175 includes a divider module 180, a matching module 182, a workflow optimization module 184, a machine learning module 186, a quality control module 188, a queue module 190, a data access module 192 and a teleoperation module 194.

The divider module 180 may perform functionality as illustrated in FIGS. 2A, 2B, 4, 5 and 6. In some embodiments, the divider module 180 identifies and/or defines one or more microtasks.

The matching module 182 may perform functionality as illustrated in FIGS. 2A, 2B, 4, 5 and 6. In some embodiments, the matching module 182 matches one or more teleoperators to respective microtasks.

The workflow optimization module 184 may perform functionality as illustrated in FIGS. 2A, 2B, 4, 5 and 6. In some embodiments, the workflow optimization module 184 accesses, receives and/or stores workflow optimization criteria and evaluates the workflow optimization criteria in accordance with available teleoperators and one or more workflows of pending tasks.

The machine learning module 186 may perform functionality as illustrated in FIGS. 2A, 2B, 4, 5 and 6. In some embodiments, the machine learning module 186 may access one or more machine learning models (or networks) to support and/or enhance any of the functionalities and/or modules described herein. In some embodiments, the machine learning module 186 may collect, store and/or update training data to train one or more one or more machine learning models based on any type of data described herein. According to various embodiments, a machine learning model may be based on Collaborative Filtering.

The quality control module 188 may perform functionality as illustrated in FIGS. 2A, 2B, 4, 5 and 6. In some embodiments, the quality control module 188 may generate, update, store and/or access quality control profiles of one or more teleoperators. In some embodiments, the quality control module 188 may generate, update, store and/or access quality requirements of one or more microtasks.

The queue module 190 may perform functionality as illustrated in FIGS. 2A, 2B, 4, 5 and 6. In some embodiments, the queue module 190 may generate, manage and/or update respective queues of one or more teleoperators.

The data access module 192 may perform functionality to support the functionalities as illustrated in FIGS. 2A, 2B, 4, 5 and 6. In some embodiments, the data access module 192 may store, access, update and/or transmit any type of data described herein. The data access module 192 may be associated with and control one or more databases such that information maintained in the one or more databases may be combined together or further separated in a manner the promotes retrieval and storage efficiency and/or data security.

The teleoperation module 194 may perform functionality as illustrated in FIGS. 2A, 2B, 3, 4, 5 and 6. In some embodiments, the teleoperation module 194 may provide access to teleoperation functionality, define and deploy teleoperation functionality, receive teleoperator selection and/or performance of teleoperation functionality and/or update store, access, update teleoperation functionality. According to various embodiments, teleoperation functionality may be the remote control of various types of equipment and/or vehicles that allow one or more teleoperators to control a movement(s), deployment, operation and use of the equipment and/or vehicles.

The control module 175 may further generate, render, transmit and/or update one or more user interface portions based on any of the data, modules and/or functionalities described herein. Embodiments may be used on a wide variety of computing devices in accordance with the definition of computer and computer system earlier in this patent. Mobile devices such as cellular phones, smart phones, PDAs, and tablets may implement the functionality described in this patent.

Figure 2A:
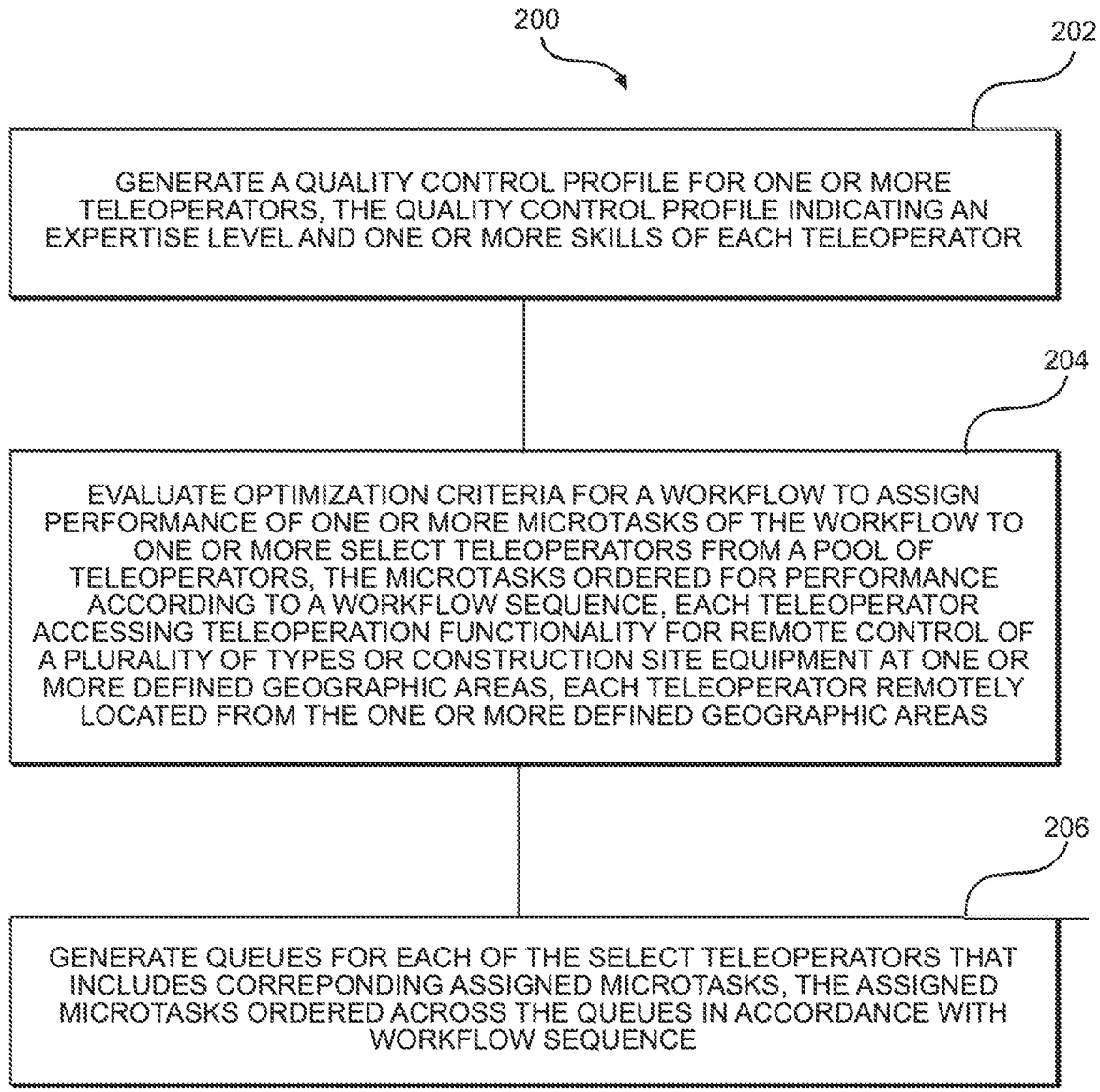
FIGS. 2A and 2B are flowcharts illustrating exemplary methods that may be performed in some embodiments.

As shown in flowchart 200 of FIG. 2A, the control module 175 generates a quality control profile for one or more teleoperators. (Act 202). The control module 175 builds a quality control profile for each teleoperator to indicate an expertise level and one or more skills of the teleoperator. A quality control profile may be based on an amount of time the teleoperator required to previously complete one or more types of microtasks in various workflows and a listing of at least one skill. A quality control profile may also be based on an amount of time the teleoperator required to previously complete an entire golden workflow divided into a plurality of pre-defined microtasks whereby the same golden workflow was also completed by other teleoperators. The quality control profile may include a golden workflow ranking based on a comparison of the teleoperator against other teleoperators that also completed the golden workflow. Golden workflow information further included in the quality control profile may be a number of maneuvers executed by the teleoperator and/or a smoothness metric of movement of the equipment controlled by the teleoperator during completion of the golden workflow. The control module 175 may compare the golden workflow information of various available teleoperators to determine teleoperators that should be assigned various microtasks according to the quality threshold requirements of the microtasks and the aspect of the corresponding workflow that is to be optimized (i.e. total time, quality of work, idle time).

The quality control profile may further include a quality score based one or more performance assessments of the respective teleoperator received from one or more other teleoperators. Such performance assessments may have been received by another teleoperator having a high expertise level for a microtask performed by the respective teleoperator. It is understood that performance assessments may be received during performance of a microtask, upon completion of a microtask and/or upon completion of the corresponding workflow. The quality control profile may further include a ranking of the respective teleoperator amongst any given pool of teleoperators based on comparing their quality control profiles and availability to be assigned pending microtasks. For attributes of a quality of control profile may be representative of, for example, a teleoperator's experience, skills, performance of previous microtasks, types of equipment previously remotely controlled, geographic area preferences, average time to complete a task/microtasks and/or weather conditions that correspond to the previous performances. The quality control profile may further include video data representative of a human teleoperator's eye and facial movements that occurred during performances of microtasks. Such eye and facial movements may correlate (or not correlate) with the human teleoperator's experience, skills, performance of previous microtasks and types of equipment previously remotely controlled.

The control module 175 evaluates optimization criteria for a workflow to assign performance of microtasks of the workflow to select teleoperators from a pool of teleoperators. (Act 204) The microtasks are ordered for performance according to a workflow sequence. For example, a first microtask is designated to be performed and completed prior to a second microtask. The second microtask is designated to be performed and completed prior to a third microtask and so on until a final microtask is performed and completed to signify the corresponding workflow is complete. In various embodiments, each teleoperator accesses teleoperation functionality for remote control of a plurality of types of construction site equipment at various defined geographic areas and each teleoperator is remotely located from the defined geographic areas.

For workflow optimization, the control module 175 accesses a quality control profile for one or more of the teleoperators in the pool of teleoperators in order to determine which of the accessed quality control profiles are associated with teleoperators that have a level of skill and expertise best suited for performance of a microtask(s). The control module 175 identifies a quality requirement for each of the respective microtasks. Each microtask may be associated with microtask data representative of a type(s) of equipment for performing the microtask, a list of maneuvers, actions and/or decisions that will occur during the microtask, weather conditions suitable for performance of the microtask, acceptable equipment status (e.g. gas level, CPU status, electrical requirements), previous instances of microtask performance and one or more teleoperators that previously performed the microtask and/or similar microtasks. It is understood that control module 175 may identify the quality requirement for a microtask may be determined according to one or more machine learning methods.

The control module 175 identifies the select teleoperators in response to matching one or more respective microtask quality requirements to one or more of the accessed quality control profiles to satisfy workflow optimization criteria. Such optimization criteria may include an optimized amount of time to complete the workflow by utilizing select teleoperators to remotely control the performance of the respective microtasks. Optimization criteria may also include an optimized quality of work metric during completion of workflow by utilizing the select teleoperators. Optimization criteria may also include an optimized amount of teleoperator idle time during completion of the workflows in order to ensure that one or more workflows are being completed while minimizing idleness time of one or more of the select teleoperators.

The control module 175 generates queues for each of the select teleoperators that includes their corresponding assigned microtasks. (Act 206) The assigned microtasks are ordered across the queues in accordance with workflow sequence.

Figure 2B:
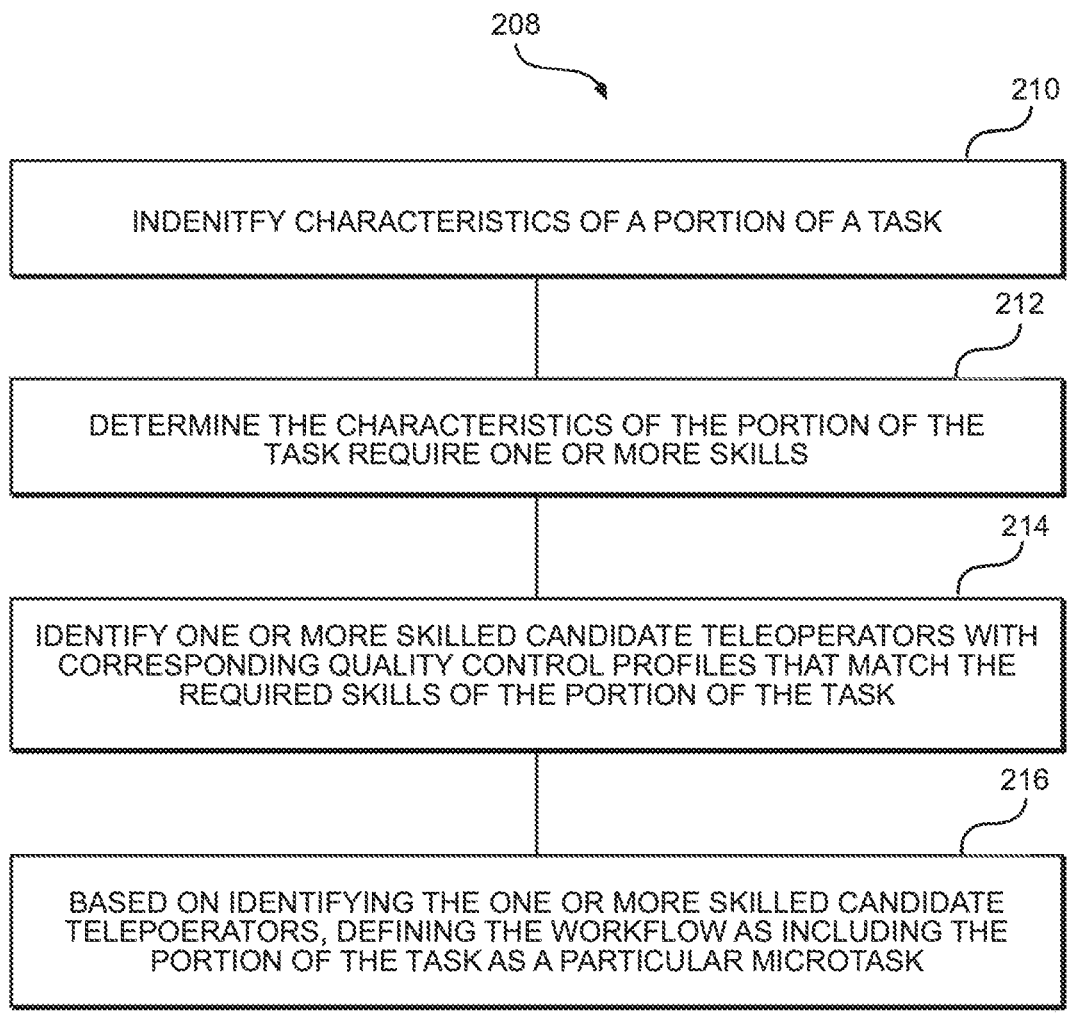

As shown in flowchart 208 of FIG. 2B, the control module 175 identifies characteristics of a portion of a task (Act 210) and determines the characteristics of the portion of the task requires one or more skills. (Act 212) For example, the control module 175 may employ one or more machine learning models to define the microtasks of a pending task's workflow based on task characteristic data and the quality control profiles of available teleoperators and previous teleoperators. For example, task characteristic data may be data for a pending task that is similar to any type of data described herein with respect to a quality control profile and/or microtask quality requirement.

The machine learning models (or networks) may be trained by the machine learning module 186 with training data representing prior performances of a pending task and/or data from prior performance of tasks that required similar actions, equipment, skills, actions, decisions, timing, quality and expertise levels as the pending task. The training data may further be based on the quality control profiles of teleoperators involved in the prior performances. The input data for the machine learning models may be based on data representative of the pending task and the available teleoperators and the machine learning models may generate output that includes a defined workflow divided into microtasks that are units of work that are to be completed according to a workflow sequence to complete the pending task in its entirety.

The control module 175 identifies one or more skilled candidate teleoperators with corresponding quality control profiles that match the required skills of the portion of the task. (Act 214) For example, the control module 175 identifies the first teleoperator to perform the particular microtask from the one or more skilled candidate teleoperators based on a threshold of similarity and/or compatibility between the first teleoperator's quality control profile and the quality requirement of the particular microtask. In addition, while the control module 175 is determining whether to assign the particular microtask to the first teleoperator, the control module 175 may be investigating evaluating—in parallel—whether to assign the other skilled candidate teleoperators to different microtasks in order to define a plurality of microtask-assigned teleoperator pairings that predict a satisfaction of one or more workflow optimization criteria. Therefore, the control module 175 may, through application of one or more rule sets and/or machine learning methods, concurrently define microtasks for a workflow of a pending task based in part on available teleoperators and the assigning the teleoperators to a corresponding recently defined microtask. To that end, based on identifying the one or more skilled candidate teleoperators, the control module 175 defines the workflow as including the portion of the task as a particular microtask. (Act 216) An embodiment may implement a Collaborative Filtering machine learning algorithm to match an available teleoperator from a set of available teleoperator to a task and/or microtask(s) from a set of tasks. The Collaborative Filtering match may be based on the teleoperator's previous performances of tasks and/or microtasks (as indicated in their respective quality control profiles) and a complexity of a task and/or microtask(s) (as represented by task characteristic data).

Some of the acts of the exemplary flowcharts 200, 208 may be performed in different orders or in parallel. Also, one or more of the acts in the exemplary flowcharts 200, 208 may occur in two or more computers, for example if the method is performed in a networked environment. Various acts may be optional. Some acts may occur on local computer with other acts occur on a remote computer.

Figure 3:
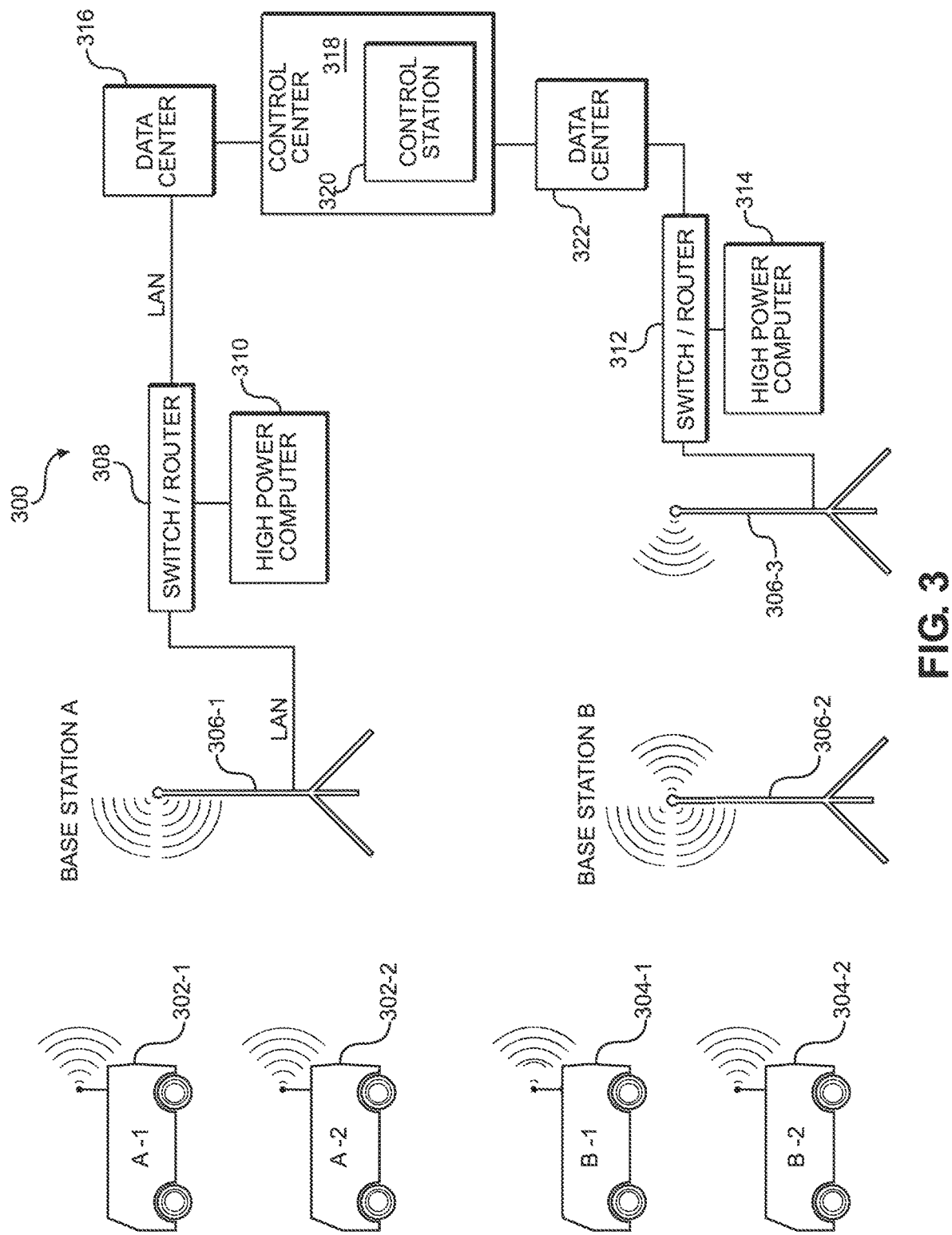
FIG. 3 is a diagram illustrating an exemplary environment in which some embodiments may operate.

As shown in FIG. 3, one or more vehicles 302-1, 302-2, 304-1, 304-2 communicate with a plurality of base stations 306-1, 306-2 at a pre-defined geographical area(s). Each base station 306-1, 306-2 may be connected to various routers 308, 312 in order to access deported compute modules 310, 314 to provide the vehicles 302-1, 302-2, 304-1, 304-2 access to optimized high-powered computing resources. One or more base stations 306-1, 306-2 may receive teleoperation microtask performance instructions for remote control of the vehicles 302-1, 302-2, 304-1, 304-2 and the base stations 306-1, 306-2 may relay vehicle status and microtask status data via the routers 308, 312 to a remotely situated control center 318 that has one or more control stations 320 (i.e. control consoles). Each of the control stations 320 may have one or more teleoperators that have access to teleoperation functionalities, peripheral controls/devices, displays and systems of the respective control stations 320 for remote control of operation of the vehicles 302-1, 302-2, 304-1, 304-2. The control center 318 and the base stations 306-1, 306-2 may also have access to various data centers 316, 322. In another embodiment, the multiple 302-1, 302-2, 304-1, 304-2 may communicate with one or more base stations (i.e. site-mesh systems, site-mesh nodes) 306-1, 306-2 located at a construction site. According to various embodiments, the control 175 may be associated with the control center 318 and/or one or more of the control stations 320.

Figure 4:
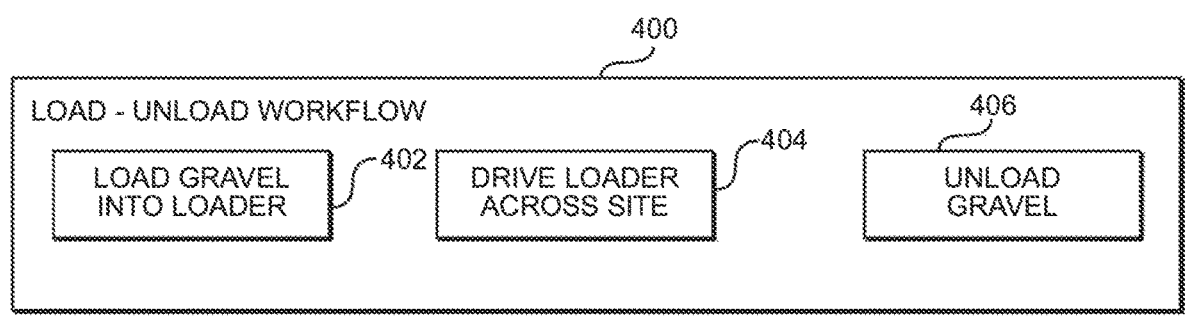
FIG. 4 is a diagram illustrating an exemplary environment in which some embodiments may operate.

As shown in FIG. 4, a pending task may be based on a workflow 400 with three microtasks 402, 404, 406. As described herein, one or more of the microtasks 402, 404, 406 may be pre-defined and received by (or stored in) the control module 175 and the control module 175 may itself define the workflow 400 and one or more of the microtasks 402, 404, 406. It is understood that a workflow of a pending tasks may have any number of microtasks.

Figure 5:
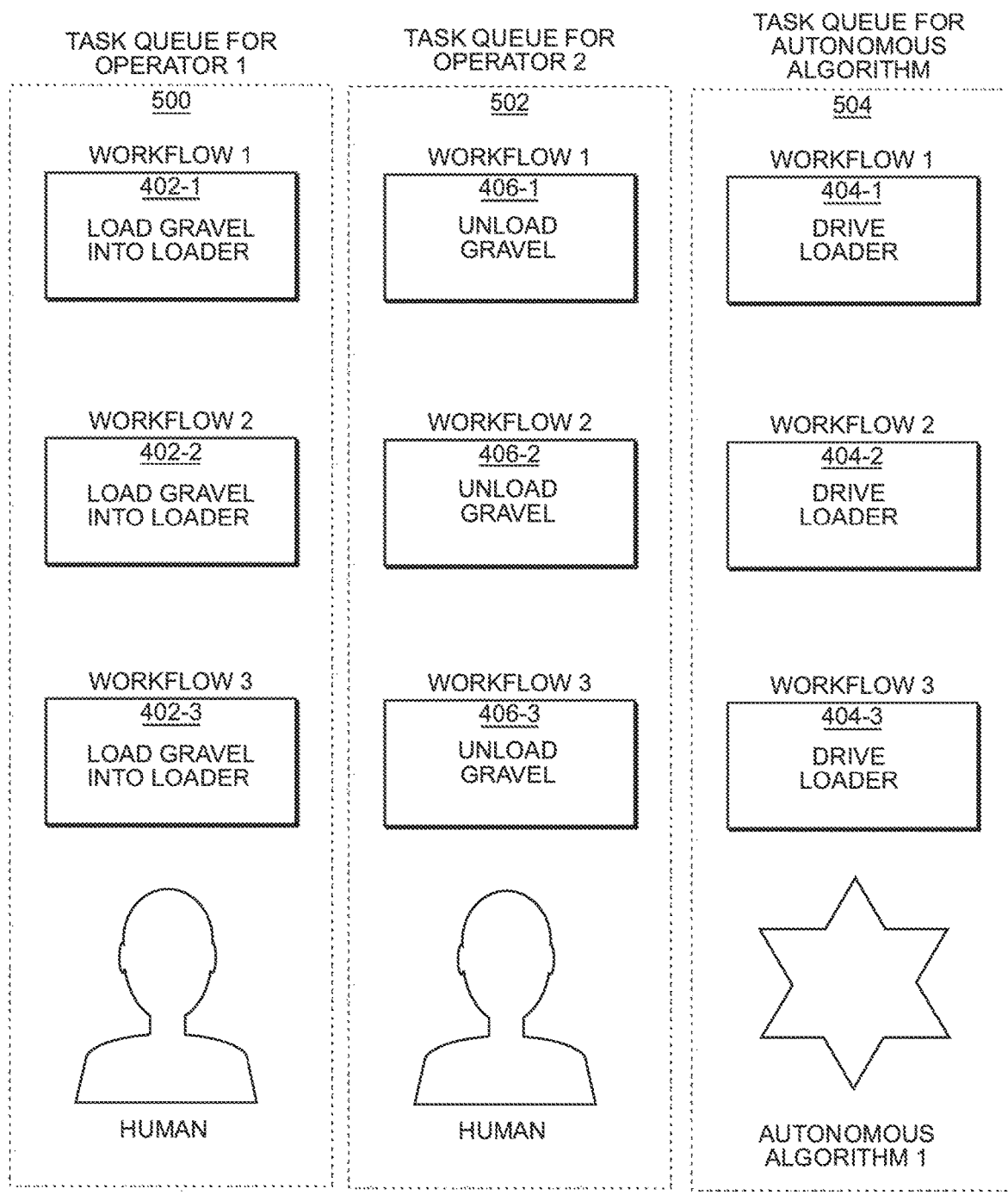
FIG. 5 is a diagram illustrating an exemplary environment in which some embodiments may operate.

As shown in FIG. 5, a first human teleoperator is associated with a first task queue 500 that includes microtasks 402-1, 402-2, 402-3 assigned to the first human teleoperator by the control module 175. A second human teleoperator is associated with a second task queue 502 that includes microtasks 406-1, 406-2, 406-3 assigned to the second human teleoperator by the control module 175. An autonomous algorithmic teleoperator is associated with a third task queue 504 that includes microtasks 404-1, 404-2, 404-3 assigned to the autonomous algorithmic teleoperator by the control module 175. A first set of microtasks 402-1, 404-1, 406-1 belongs to a first workflow ("Workflow 1") such that an order of performance according to a workflow sequence of the first set of microtasks 402-1, 404-1, 406-1 is distributed across the task queues 500, 502, 504 by the control module 175. For example, the control module 175 will notify the first human teleoperator to initiate and complete a first microtask 402-1 of Workflow 1. Upon completion of the first microtask 402-1, the control module 175 will trigger the autonomous algorithmic teleoperator to initiate and complete a second microtask 404-1 of Workflow 1. Upon completion of the second microtask 404-1, the control module 175 will notify the second human teleoperator to initiate and complete a third microtask 406-1 of Workflow 1. Similarly, a second set of microtasks 402-2, 404-2, 406-2 belongs to a second workflow ("Workflow 2") such that an order of performance of the second set of microtasks 402-2, 404-2, 406-2 is the same workflow sequence and is distributed across the task queues 500, 502, 504 by the control module 175. A third set of microtasks 402-3, 404-3, 406-3 belongs to a third workflow ("Workflow 3") such that an order of performance of the third set of microtasks 402-3, 404-3, 406-3 is the same workflow sequence and is also distributed across the task queues 500, 502, 504 by the control module 175. It is understood that task queues of teleoperators are not limited to include only the same microtasks from the same type of workflows. Stated differently, according to various embodiments, completely different microtasks for completely different workflows may be distributed across respective queues of teleoperators.

Figure 6:
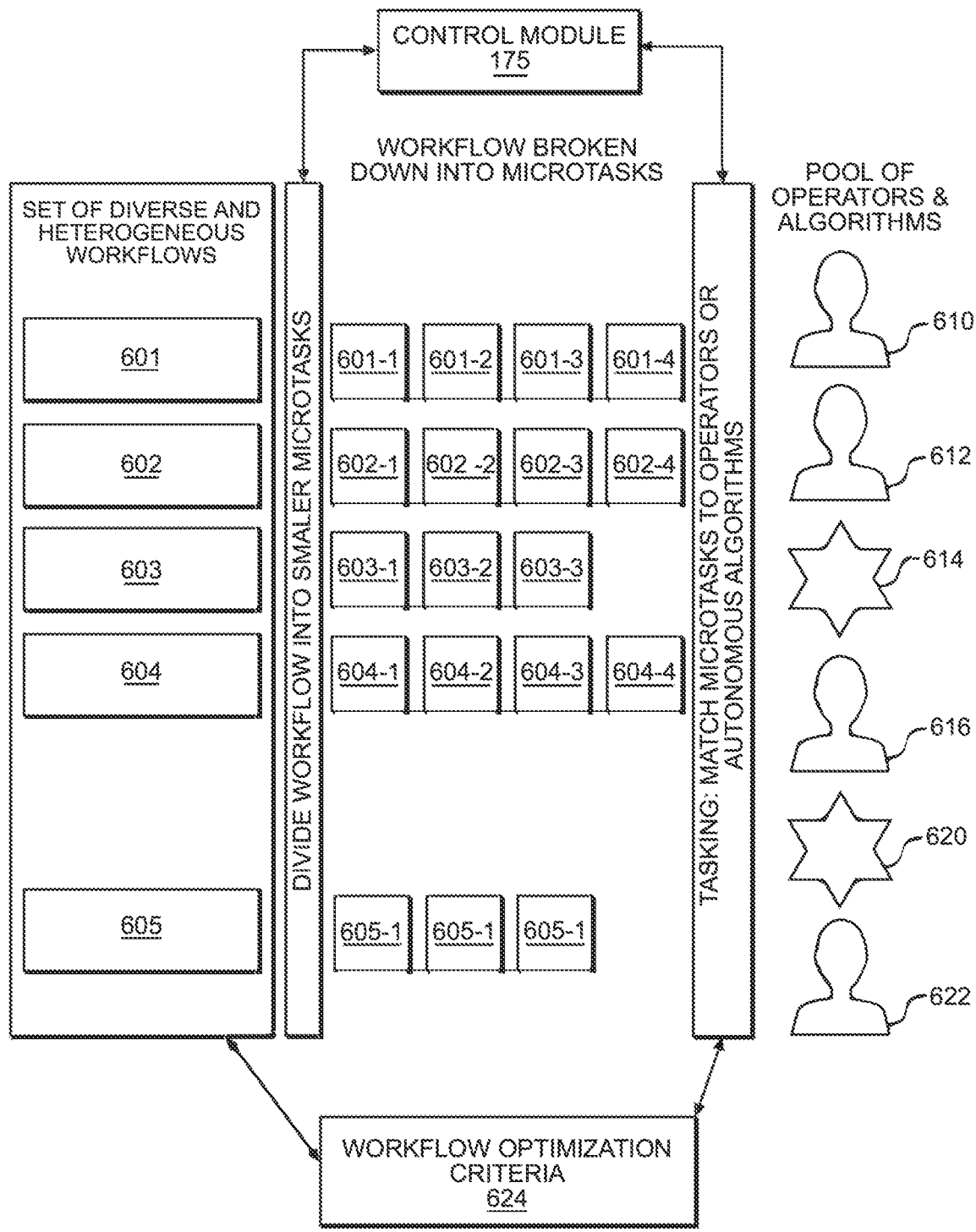
FIG. 6 is a diagram illustrating an exemplary environment in which some embodiments may operate.

As shown in FIG. 6, each of a plurality of pending tasks are represented according to a workflow 600, 602, 604, 606, 608. The workflows may include one or more pre-defined microtasks. In other embodiments, the control module 175 may employ the divider module 180 to identifies and/or defines the microtasks within a particular workflow(s). The divider module 180 identifies the microtasks 601-1, 601-2, 601-3, 601-4 for a first workflow 601, microtasks 602-1, 602-2, 602-3, 602-4 for a second workflow 602, microtasks 603-1, 603-2, 603- for a third workflow 603, microtasks 604-1, 604-2, 604-3, 604-4 for a fourth workflow 604 and microtasks 605-1, 605-2, 605-3 for a fifth workflow 605. It is understood that identifying and/or defining microtasks of different workflows of pending tasks may be done sequentially as between the workflows and/or in parallel. It is further understood that that some or all of the respective microtasks of the workflows 601, 602, 603, 604, 605 may be the same or similar while some or all of the respective microtasks may be completely different.

The matching module 182 receives the respective microtasks of the workflows 601, 602, 603, 604, 605. The matching module 182 identifies the pool of teleoperators to include one or more human teleoperators 610, 612, 616, 622 and one or more autonomous algorithmic teleoperators 614, 620. The matching module 182 accesses the quality requirements of each of the respective microtasks of the workflows 601, 602, 603, 604, 605 and the quality control profiles of each of the teleoperators 610, 612, 614, 616, 620 622. The matching module 182 further accesses workflow optimization criteria 624 of each workflow 601, 602, 603, 604, 605. The matching module 182 processes and evaluates the quality requirements of each of the respective microtasks, the quality control profiles of the teleoperators 610, 612, 614, 616, 620 622 and the workflow optimization criteria 624 of each workflow 601, 602, 603, 604, 605 in order to assign the respective microtasks of the workflows 601, 602, 603, 604, 605 to individual queues for each of the teleoperators 610, 612, 614, 616, 620 622.

Figure 7:
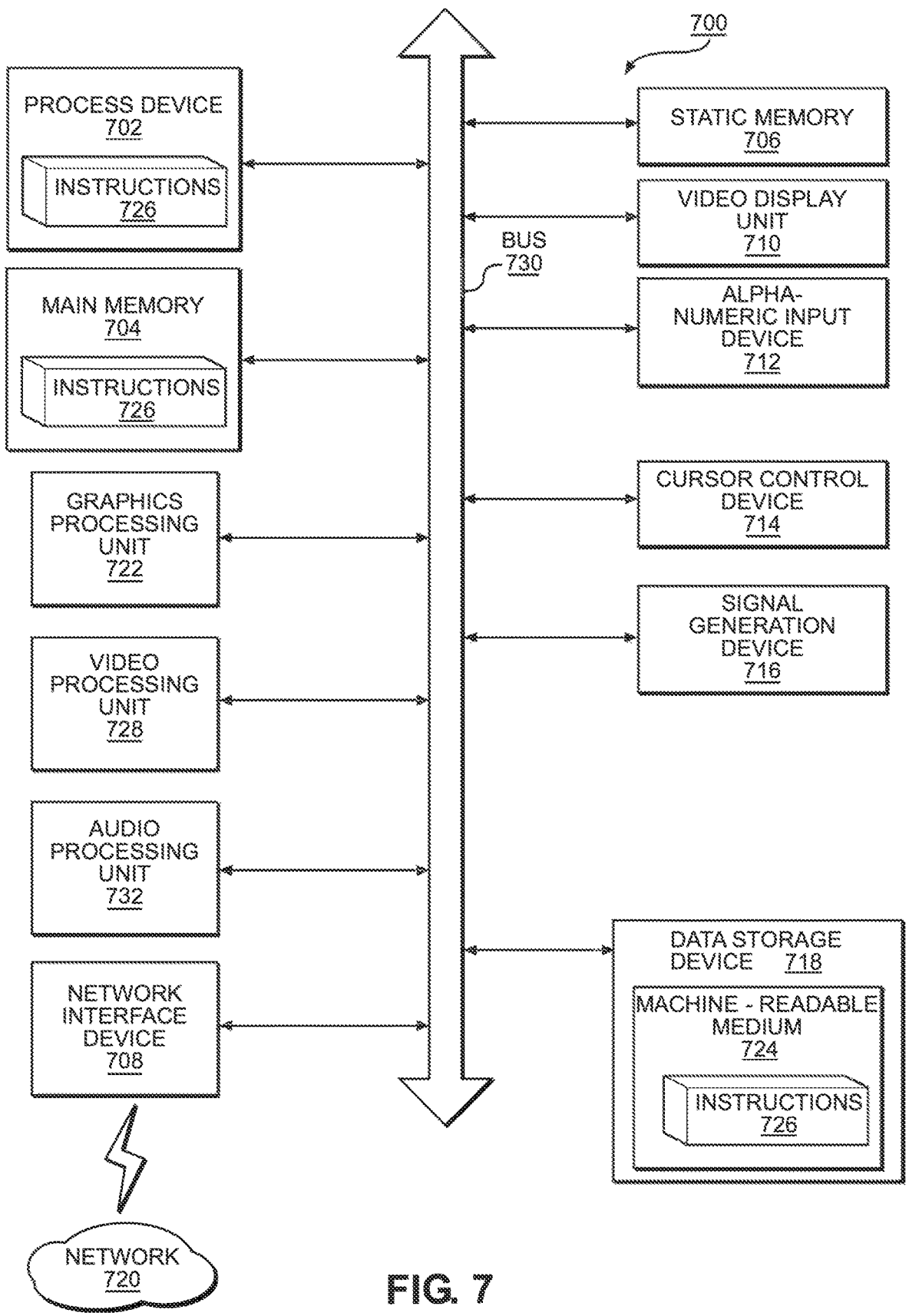
FIG. 7 is a diagram illustrating an exemplary computer that may perform processing in some embodiments.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:
generating a quality control profile for one or more teleoperators, the quality control profile indicating an expertise level and one or more skills of each teleoperator;
evaluating optimization criteria for a workflow to assign performance of one or more microtasks of the workflow to one or more select teleoperators from a pool of teleoperators based in part on the respective quality control profiles, the microtasks ordered for performance according to a workflow sequence, each teleoperator accessing teleoperation functionality for remote control of a plurality of types of construction site equipment at one or more defined geographic areas, each teleoperator remotely located from the one or more defined geographic areas;

a collaborative filtering machine learning model of a control module, matching an available teleoperator to a workflow, task or microtask, by dividing the workflow across more than one teleoperator, wherein the teleoperators comprise one or more human teleoperators and an autonomous algorithmic teleoperator;

training the machine learning model with training data based on prior performances of the workflow, and the quality control profiles of the teleoperators involved in the prior performances of the workflow;

the machine learning model, receiving input data comprising the workflow;

the machine learning model, generating a machine learning model output comprising a division of the workflow into microtasks, the microtasks comprising units of work to be completed according to a workflow sequence to complete the workflow;

generating queues for each of the select teleoperators that includes corresponding assigned microtasks, the assigned microtasks ordered across the queues in accordance with workflow sequence, wherein generating queues comprises:
   generating a first queue for a first teleoperator and a second queue for a second teleoperator;
   assigning, to the first queue, a first microtask of a first workflow sequence and a first microtask of a second workflow sequence;
   assigning, to the second queue, a second microtask of the first workflow sequence and a second microtask of the second workflow sequence;
   wherein the second microtask of the first workflow in the second queue is defined for initiation subsequent to completion of the first microtask of the first workflow in the first queue; and
   wherein the second microtask of the second workflow in the second queue is defined for initiation subsequent to completion of a second microtask of the second workflow in the first queue;

the control module, via a divider module, dividing the workflow into a plurality of microtasks, based at least in part on the optimization criteria, and the matching outputted by the machine learning model;

the control module, distributing the plurality of the microtasks between the one or more human teleoperators and the autonomous algorithmic teleoperator;

the control module triggering the autonomous algorithmic teleoperator to initiate performance of a microtask matched with the autonomous algorithmic teleoperator;

a teleoperation module, generating and/or updating the teleoperation functionality, wherein the teleoperation functionality comprises instructions for remote control of a construction vehicle, wherein the remote control comprises remote control of movement, deployment, operation and use of equipment of the construction vehicle;

the teleoperation module, receiving a selection of a teleoperator;

the teleoperation module, providing access to and deploying the teleoperation functionality, based at least in part on the received selection of the teleoperator;

the control module transmitting to the construction vehicle, teleoperations functionality corresponding to the microtask matched with the autonomous algorithmic teleoperator, the teleoperations functionality comprising instructions for autonomous performance of vehicle functionality;

the autonomous algorithmic teleoperator performing the teleoperation functionality, causing remote autonomous operation of the construction vehicle, based at least in part on the teleoperation functionality;

the control module, receiving status data of the construction vehicle performing the autonomous vehicle functionality; and the control module, upon completion of performance of the microtask matched with the autonomous algorithmic teleoperator, providing a notification.

2. The computer-implemented method as in claim 1, wherein the pool of teleoperators includes:
   i) one or more human teleoperators for performance of respective microtasks via remote control of the plurality of types of construction site equipment; and
   ii) one or more algorithms for performance of respective microtasks via remote control of the plurality of types of construction site equipment.

3. The computer-implemented method as in claim 1, wherein generating a quality control profile for one or more teleoperators comprises:
   building a quality control profile for each respective teleoperator based at least on one of:
      i) an amount of time the teleoperator required to previously complete one or more types of microtasks in various workflows;
      ii) an amount of time the teleoperator required to previously complete an entire golden workflow divided into a plurality of pre-defined microtasks, the golden workflow also completed by other teleoperators;
      iii) a golden workflow ranking based on a comparison of the teleoperator against one or more of the other teleoperators that also completed the golden workflow;
      iv) a quality score based one or more performance assessments of the respective teleoperator received from one or more other teleoperators;
      v) a ranking of the respective teleoperator amongst any given pool of teleoperators; and
      vi) a listing of at least one skill.

4. The computer-implemented method as in claim 3, wherein evaluating optimization criteria for a workflow to assign performance of one or more microtasks of the workflow to respective select teleoperators from a pool of teleoperators comprises:
   accessing a quality control profile for one or more of the teleoperators in the pool of teleoperators;
   determining a quality requirement for each of the respective microtasks; and identifying the select teleoperators in response to matching each respective microtask quality requirement to one or more of the accessed quality control profiles to meet at least one of:
      i) an optimized amount of time to complete the workflow by utilizing the select teleoperators to remotely control the performance of the respective microtasks;
      ii) an optimized quality of work metric during completion of the one or more workflows by utilizing the select teleoperators to remotely control the performance of the respective microtasks; and iii) an optimized amount of teleoperator idle time during completion of the one or more workflows by utilizing the select teleoperators to remotely control the performance of the respective microtasks.

5. The computer-implemented method as in claim 4, wherein identifying the select teleoperators in response to matching each respective quality requirement to one or more of the accessed quality control profiles comprises:
   identifying a first teleoperator with a corresponding quality control profile that indicates a level of quality that at least matches a threshold of a first microtask's quality requirement; and
   determining performance of the first microtask by the first teleoperator in conjunction with performance, according to the workflow sequence, of respective microtasks assigned to other select teleoperators meets the optimization criteria of the workflow.

6. The computer-implemented method as in claim 5, wherein determining a quality requirement for each of the respective microtasks comprises:
   identifying characteristics of a portion of a task;
   determining the characteristics of the portion of the task require one or more skills; identifying one or more skilled candidate teleoperators with corresponding quality control
   profiles that match the required skills of the portion of the task;
   based on identifying the one or more skilled candidate teleoperators, defining the workflow as including the portion of the task as a particular microtask; and
   wherein identifying a first teleoperator with a corresponding quality control profile that indicates a level of quality that at least matches a threshold of a first microtask's quality requirement comprises:
      identifying the first teleoperator to perform the particular microtask from the one or more skilled candidate teleoperators.

7. The computer-implemented method as in claim 1, wherein at least one machine learning method from a plurality of machine learning methods is applied to evaluate the optimization criteria for the workflow.

8. A system comprising:
   one or more processors; and
   a non-transitory computer readable medium storing a plurality of instructions, which when executed, cause the one or more processors to:
      generate a quality control profile for one or more teleoperators, the quality control profile indicating an expertise level and one or more skills of each teleoperator;
      evaluate optimization criteria for a workflow to assign performance of one or more microtasks of the workflow to one or more select teleoperators from a pool of teleoperators based in part on the respective quality control profiles, the microtasks ordered for performance according to a workflow sequence, each teleoperator accessing teleoperation functionality for remote control of a plurality of types of construction site equipment at one or more defined geographic areas, each teleoperator remotely located from the one or more defined geographic areas;
      a collaborative filtering machine learning model of a control module, matching an available teleoperator to a workflow, task or microtask, by dividing the workflow across more than one teleoperator, wherein the teleoperators comprise one or more human teleoperators and an autonomous algorithmic teleoperator;
      train the machine learning model with training data based on prior performances of the workflow, and the quality control profiles of the teleoperators involved in the prior performances of the workflow;
      the machine learning model, receiving input data comprising the workflow;
      the machine learning model, generating a machine learning model output comprising a division of the workflow into microtasks, the microtasks comprising units of work to be completed according to a workflow sequence to complete the workflow;
      generate queues for each of the select teleoperators that includes corresponding assigned microtasks, the assigned microtasks ordered across the queues in accordance with workflow sequence, wherein generating queues comprises:
      generating a first queue for a first teleoperator and a second queue for a second teleoperator;
      assigning, to the first queue, a first microtask of a first workflow sequence and a second microtask of a second workflow sequence;
      assigning, to the second queue, a second microtask of the first workflow sequence and a second microtask of the second workflow sequence;
      wherein the second microtask of the first workflow in the second queue is defined for initiation subsequent to completion of the first microtask of the first workflow in the first queue; and
      wherein the second microtask of the second workflow in the second queue is defined for initiation subsequent to completion of a second microtask of the second workflow in the first queue;
   wherein the control module, comprising a divider module, is configured to divide the workflow into a plurality of microtasks, based at least in part on the optimization criteria, and the matching outputted by the machine learning model;
   wherein the control module, is configured to distribute the plurality of the microtasks between the one or more human teleoperators and the autonomous algorithmic teleoperator;
   wherein the control module is configured to trigger the autonomous algorithmic teleoperator to initiate performance of a microtask matched with the autonomous algorithmic teleoperator;
   wherein a teleoperation module, is configured to generate and/or update the teleoperation functionality, wherein the teleoperation functionality comprises instructions for remote control of a construction vehicle, wherein the remote control comprises remote control of movement, deployment, operation and use of equipment of the construction vehicle;
   wherein the teleoperation module, is configured to receive a selection of a teleoperator;
   wherein the teleoperation module, is configured to provide access to and deploy the teleoperation functionality, based at least in part on the received selection of the teleoperator;
   wherein the control module is configured to transmit to the construction vehicle, teleoperations functionality corresponding to the microtask matched with the autonomous algorithmic teleoperator, the teleoperations functionality comprising instructions for autonomous performance of vehicle functionality;

wherein the autonomous algorithmic teleoperator is configured to perform the teleoperation functionality, causing remote autonomous operation of the construction vehicle, based at least in part on the teleoperation functionality;

wherein the control module, is configured to receive status data of the construction vehicle performing the autonomous vehicle functionality; and wherein the control module, upon completion of performance of the microtask matched with the autonomous algorithmic teleoperator, is configured to provide a notification.

9. The system as in claim 8, wherein the pool of teleoperators includes:
   i) one or more human teleoperators for performance of respective microtasks via remote control of the plurality of types of construction site equipment; and
   ii) one or more algorithms for performance of respective microtasks via remote control of the plurality of types of construction site equipment.

10. The system as in claim 8, wherein generate a quality control profile for one or more teleoperators comprises:
   build a quality control profile for each respective teleoperator based at least on one of:
      i) an amount of time the teleoperator required to previously complete one or more types of microtasks in various workflows;
      ii) an amount of time the teleoperator required to previously complete an entire golden workflow divided into a plurality of pre-defined microtasks, the golden workflow also completed by other teleoperators;
      iii) a golden workflow ranking based on a comparison of the teleoperator against one or more of the other teleoperators that also completed the golden workflow;
      iv) a quality score based one or more performance assessments of the respective teleoperator received from one or more other teleoperators;
      v) a ranking of the respective teleoperator amongst any given pool of teleoperators; and
      vi) a listing of at least one skill.

11. The system as in claim 10, wherein evaluate optimization criteria for a workflow to assign performance of one or more microtasks of the workflow to respective select teleoperators from a pool of teleoperators comprises:
   access a quality control profile for one or more of the teleoperators in the pool of teleoperators;
   determine a quality requirement for each of the respective microtasks; and
   identify the select teleoperators in response to matching each respective microtask quality requirement to one or more of the accessed quality control profiles to meet at least one of:
      i) an optimized amount of time to complete the workflow by utilizing the select teleoperators to remotely control the performance of the respective microtasks;
      ii) an optimized quality of work metric during completion of the one or more workflows by utilizing the select teleoperators to remotely control the performance of the respective microtasks; and
      iii) an optimized amount of teleoperator idle time during completion of the one or more workflows by utilizing the select teleoperators to remotely control the performance of the respective microtasks.

12. The system as in claim 11, wherein identify the select teleoperators in response to matching each respective quality requirement to one or more of the accessed quality control profiles comprises:
   identify a first teleoperator with a corresponding quality control profile that indicates a level of quality that at least matches a threshold of a first microtask's quality requirement; and
   determine performance of the first microtask by the first teleoperator in conjunction with performance, according to the workflow sequence, of respective microtasks assigned to other select teleoperators meets the optimization criteria of the workflow.

13. The system as in claim 12, wherein determine a quality requirement for each of the respective microtasks comprises:
   identify characteristics of a portion of a task;
   determine the characteristics of the portion of the task require one or more skills;
   identify one or more skilled candidate teleoperators with corresponding quality control profiles that match the required skills of the portion of the task;
   based on identifying the one or more skilled candidate teleoperators, define the workflow as including the portion of the task as a particular microtask; and
   wherein identify a first teleoperator with a corresponding quality control profile that indicates a level of quality that at least matches a threshold of a first microtask's quality requirement comprises:
      identify the first teleoperator to perform the particular microtask from the one or more skilled candidate teleoperators.

14. The system as in claim 8, wherein at least one machine learning method from a plurality of machine learning methods is applied to evaluate the optimization criteria for the workflow.

15. A computer program product comprising a non-transitory computer-readable medium having a computer-readable program code embodied therein to be executed by one or more processors, the program code including instructions to:
   generate a quality control profile for one or more teleoperators, the quality control profile indicating an expertise level and one or more skills of each teleoperator;
   evaluate optimization criteria for a workflow to assign performance of one or more microtasks of the workflow to one or more select teleoperators from a pool of teleoperators based in part on the respective quality control profiles, the microtasks ordered for performance according to a workflow sequence, each teleoperator accessing teleoperation functionality for remote control of a plurality of types of construction site equipment at one or more defined geographic areas, each teleoperator remotely located from the one or more defined geographic areas;
   a collaborative filtering machine learning model of a control module, matching an available teleoperator to a workflow, task or microtask, by dividing the workflow across more than one teleoperator, wherein the teleoperators comprise one or more human teleoperators and an autonomous algorithmic teleoperator;
   train the machine learning model with training data based on prior performances of the workflow, and the quality control profiles of the teleoperators involved in the prior performances of the workflow;
   the machine learning model, receiving input data comprising the workflow;

the machine learning model, generating a machine learning model output comprising a division of the workflow into microtasks, the microtasks comprising units of work to be completed according to a workflow sequence to complete the workflow;

generate queues for each of the select teleoperators that includes corresponding assigned microtasks, the assigned microtasks ordered across the queues in accordance with workflow sequence, wherein generating queues comprises:

generating a first queue for a first teleoperator and a second queue for a second teleoperator;

assigning, to the first queue, a first microtask of a first workflow sequence and a first microtask of a second workflow sequence;

assigning, to the second queue, a second microtask of the first workflow sequence and a second microtask of the second workflow sequence;

wherein the second microtask of the first workflow in the second queue is defined for initiation subsequent to completion of the first microtask of the first workflow in the first queue; and wherein the second microtask of the second workflow in the second queue is defined for initiation subsequent to completion of a second microtask of the second workflow in the first queue;

the control module, via a divider module, dividing the workflow into a plurality of microtasks, based at least in part on the optimization criteria, and the matching outputted by the machine learning model;

the control module, distributing the plurality of the microtasks between the one or more human teleoperators and the autonomous algorithmic teleoperator;

the control module triggering the autonomous algorithmic teleoperator to initiate performance of a microtask matched with the autonomous algorithmic teleoperator;

a teleoperation module, generating and/or updating the teleoperation functionality, wherein the teleoperation functionality comprises instructions for remote control of a construction vehicle, wherein the remote control comprises remote control of movement, deployment, operation and use of equipment of the construction vehicle;

the teleoperation module, receiving a selection of a teleoperator;

the teleoperation module, providing access to and deploying the teleoperation functionality, based at least in part on the received selection of the teleoperator;

the control module transmitting to the construction vehicle, teleoperations functionality corresponding to the microtask matched with the autonomous algorithmic teleoperator, the teleoperations functionality comprising instructions for autonomous performance of vehicle functionality;

the autonomous algorithmic teleoperator performing the teleoperation functionality, causing remote autonomous operation of the construction vehicle, based at least in part on the teleoperation functionality;

the control module, receiving status data of the construction vehicle performing the autonomous vehicle functionality; and the control module, upon completion of performance of the microtask matched with the autonomous algorithmic teleoperator, providing a notification.

16. The computer program product as in claim 15, wherein the pool of teleoperators includes:

i) one or more human teleoperators for performance of respective microtasks via remote control of the plurality of types of construction site equipment; and ii) one or more algorithms for performance of respective microtasks via remote control of the plurality of types of construction site equipment.

17. The computer program product as in claim 15, wherein generate a quality control profile for one or more teleoperators comprises:

build a quality control profile for each respective teleoperator based at least on one of:

i) an amount of time the teleoperator required to previously complete one or more types of microtasks in various workflows;

ii) an amount of time the teleoperator required to previously complete an entire golden workflow divided into a plurality of pre-defined microtasks, the golden workflow also completed by other teleoperators;

iii) a golden workflow ranking based on a comparison of the teleoperator against one or more of the other teleoperators that also completed the golden workflow;

iv) a quality score based one or more performance assessments of the respective teleoperator received from one or more other teleoperators;

v) a ranking of the respective teleoperator amongst any given pool of teleoperators; and vi) a listing of at least one skill.

18. The computer program product as in claim 17, wherein evaluate optimization criteria for a workflow to assign performance of one or more microtasks of the workflow to respective select teleoperators from a pool of teleoperators comprises:

access a quality control profile for one or more of the teleoperators in the pool of teleoperators;

determine a quality requirement for each of the respective microtasks; and identify the select teleoperators in response to matching each respective microtask quality requirement to one or more of the accessed quality control profiles to meet at least one of:

i) an optimized amount of time to complete the workflow by utilizing the select teleoperators to remotely control the performance of the respective microtasks;

ii) an optimized quality of work metric during completion of the one or more workflows by utilizing the select teleoperators to remotely control the performance of the respective microtasks; and iii) an optimized amount of teleoperator idle time during completion of the one or more workflows by utilizing the select teleoperators to remotely control the performance of the respective microtasks.

19. The computer program product as in claim 18, wherein identify the select teleoperators in response to matching each respective quality requirement to one or more of the accessed quality control profiles comprises:

identify a first teleoperator with a corresponding quality control profile that indicates a level of quality that at least matches a threshold of a first microtask's quality requirement; and determine performance of the first microtask by the first teleoperator in conjunction with performance, according to the workflow sequence, of respective microtasks assigned to other select teleoperators meets the optimization criteria of the workflow.

20. The computer program product as in claim 19, wherein determine a quality requirement for each of the respective microtasks comprises:
   identify characteristics of a portion of a task;
   determine the characteristics of the portion of the task require one or more skills; identify one or more skilled candidate teleoperators with corresponding quality control profiles that match the required skills of the portion of the task;
   based on identifying the one or more skilled candidate teleoperators, define the workflow as including the portion of the task as a particular microtask; and
   wherein identify a first teleoperator with a corresponding quality control profile that indicates a level of quality that at least matches a threshold of a first microtask's quality requirement comprises:
      identify the first teleoperator to perform the particular microtask from the one or more skilled candidate teleoperators.

21. The computer program product as in claim 20, wherein at least one machine learning method from a plurality of machine learning methods is applied to evaluate the optimization criteria for the workflow;
   wherein at least one machine learning method from a plurality of machine learning methods is applied to evaluate the optimization criteria for the workflow, determine one or more quality requirements for one or more respective microtasks, identify a match between one or more teleoperators with one or more respective microtask quality requirements, define a respective workflow as including a respective microtask; and
   wherein updating training data for the at least one machine learning method is based on a result from one or more of: evaluation of the optimization criteria for the workflow, determination of the one or more quality requirements for one or more respective microtasks, identification of a match between the one or more teleoperators with the one or more respective microtask quality requirements and the defined respective workflow.

* * * * *